United States Patent
Totani et al.

(10) Patent No.: US 8,854,735 B2
(45) Date of Patent: Oct. 7, 2014

(54) VIRTUAL IMAGE DISPLAY SYSTEM

(75) Inventors: Takahiro Totani, Suwa (JP); Masayuki Takagi, Shiojiri (JP); Toshiaki Miyao, Matsumoto (JP); Akira Komatsu, Kamiina-gun (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 13/355,893

(22) Filed: Jan. 23, 2012

(65) Prior Publication Data

US 2012/0206817 A1 Aug. 16, 2012

(30) Foreign Application Priority Data

Feb. 16, 2011 (JP) .................................. 2011-030542

(51) Int. Cl.
*G02B 27/14* (2006.01)
*G02B 27/01* (2006.01)
*F21V 8/00* (2006.01)

(52) U.S. Cl.
CPC .......... *G02B 27/14* (2013.01); *G02B 2027/012* (2013.01); *G02B 27/0172* (2013.01); *G02B 6/0045* (2013.01); *G02B 2027/0178* (2013.01)
USPC .......................................... 359/633; 359/630

(58) Field of Classification Search
CPC ............. G02B 27/14; G02B 2027/012; G02B 2027/0178; G02B 27/0172; G02B 6/0045
USPC ................................................ 359/630–633
See application file for complete search history.

(56) References Cited

U.S. PATENT DOCUMENTS

| | | | |
|---|---|---|---|
| 6,219,188 B1 | 4/2001 | Tsukamoto | |
| 7,944,616 B2 * | 5/2011 | Mukawa | 359/630 |
| 8,052,308 B2 * | 11/2011 | Kamijima | 362/293 |
| 2001/0010598 A1 | 8/2001 | Aritake et al. | |
| 2006/0087755 A1 | 4/2006 | Richard | |
| 2007/0047091 A1 | 3/2007 | Spitzer et al. | |
| 2007/0058261 A1 | 3/2007 | Sugihara et al. | |
| 2007/0091445 A1 | 4/2007 | Amitai | |

(Continued)

FOREIGN PATENT DOCUMENTS

| JP | A-11-249067 | 9/1999 |
|---|---|---|
| JP | A-2006-003879 | 1/2006 |

(Continued)

OTHER PUBLICATIONS

Jan. 29, 2013 Office Action issued in U.S. Appl. No. 13/357,205.

(Continued)

*Primary Examiner* — Thomas K Pham
*Assistant Examiner* — Vipin Patel
(74) *Attorney, Agent, or Firm* — Oliff PLC

(57) ABSTRACT

A thickness of a tapered part provided at the deeper side (−X side) in a light guide direction of a light transmission member is smaller toward the deeper side, and thus, a reflection angle of ghost light that has passed through a fourth reflection surface provided with a half mirror layer and reached the light transmission member gradually becomes smaller within the tapered part and no longer satisfies a total reflection condition, and the light is ejected to the outside in the position diverging from an eye of an observer. That is, the tapered part may prevent the ghost light from reaching the eye and good see-through observation can be realized.

9 Claims, 11 Drawing Sheets

(56) References Cited

U.S. PATENT DOCUMENTS

| | | |
|---|---|---|
| 2008/0239422 A1 | 10/2008 | Noda |
| 2010/0103078 A1 | 4/2010 | Mukawa et al. |
| 2010/0245211 A1 | 9/2010 | Iba et al. |
| 2011/0181960 A1 | 7/2011 | Tanijiri |
| 2012/0200935 A1 | 8/2012 | Miyao et al. |
| 2012/0200936 A1 | 8/2012 | Takagi et al. |
| 2012/0200937 A1 | 8/2012 | Totani et al. |
| 2012/0200938 A1 | 8/2012 | Totani et al. |

FOREIGN PATENT DOCUMENTS

| | | |
|---|---|---|
| JP | A-2007-505352 | 3/2007 |
| JP | A-2007-129550 | 5/2007 |
| JP | A-2008-052096 | 3/2008 |
| JP | A-2008-122511 | 5/2008 |
| JP | A-2008-165016 | 7/2008 |
| JP | A-2008-535001 | 8/2008 |
| JP | A-2008-268873 | 11/2008 |
| JP | A-2010-224473 | 10/2010 |
| JP | A-2010-230716 | 10/2010 |
| JP | A-2010-276914 | 12/2010 |
| WO | WO 2005/024491 A1 | 3/2005 |
| WO | WO 2005/024969 A2 | 3/2005 |
| WO | WO 2010/041578 A1 | 4/2010 |

OTHER PUBLICATIONS

Jan. 30, 2013 Office Action issued in U.S. Appl. No. 13/363,732.
Jun. 20, 2013 Office Action issued in U.S. Appl. No. 13/353,641.
Dec. 9, 2013 Office Action issued in U.S. Appl. No. 13/353,641.

* cited by examiner

VIRTUAL IMAGE DISPLAY SYSTEM

BACKGROUND

1. Technical Field

The present invention relates to a virtual image display system such as a head-mounted display mounted on a head.

2. Related Art

Recently, as virtual image display systems that enable formation and observation of virtual images like head-mounted displays, various systems of a type of guiding image light from a display device to an eye of an observer using a light guide plate have been proposed.

In the virtual image display systems, for superimposition of image light and external light, see-through optical systems have been proposed (see Patent Document 1 (JP-A-2006-3879) and Patent Document 2 (JP-A-2010-224473)).

However, in the system described in Patent Document 1 and the like, seeing through is realized by an eye division method using a light guide optical system having a smaller output aperture than the eye size, and it is difficult to make the display size of the virtual image larger. Further, since the light guide optical system smaller than the eye size is used, it is difficult to make the effective pupil diameter (lighting diameter that enables introduction of virtual images, also referred to as "eye ring diameter") for matching with the individual pupil distances of humans. Furthermore, since the output aperture and the casing of the light guide optical system is placed physically near the eye, a blind spot is produced and seeing through is not complete.

Note that, as an optical system for head-mounted display, there is one having a light guide pipe that may advance plural light modes having different light guide angles (see Patent Document 3 (JP-A-2008-535001)). It is conceivable that a see-through display system is formed by using a half mirror as the third optical surface at the output side and making the transmitted light through the third optical surface travel straight (for example, adding a prism) in the optical system.

However, in the optical system in Patent Document 3, on the assumption that images by plural light modes are misaligned with one another, a liquid crystal panel is illuminated by collimated lights set at different incident angles with respect to each light mode. Further, by changing the display contents in the respective light modes and sequentially executing displays of the respective light modes, the images of the respective light modes are joined and a whole image is obtained. In this case, one liquid crystal panel should display the center image and the right and left images forming the whole image while changing them with time differences, and the virtual image display system becomes complicated and the images for observation become darker.

Besides, a virtual image display system that enables observation of virtual images by superimposition on external light using a light guide member having a light-exiting part covering the view without necessity to join the images with time differences is conceivable, however, it is not easy to display a large image, and, when a member such as a prism for seeing through is connected to the light guide member, ghost light is generated by the member and the ghost light becomes easier to reach.

SUMMARY

An advantage of some aspects of the invention is to provide a virtual image display system that can realize see-through observation and suppress observation of ghost light.

A virtual image display system according to an aspect of the invention includes (a) an image display device that forms image light, (b) a projection system that allows the image light output from the image display device to enter, (c) a light guide member having an integrated block shape that has a light guide part, a light-incident part allowing the image light from the projection system to enter the light guide part and a light-exiting part that outputs the image light guided by the light guide part to the outside, and enables observation of the image light via the light-exiting part, and (d) a light transmission member that enables observation of external light by being combined with the light guide member, wherein (e) the light guide part has a first reflection surface and a second reflection surface that are provided in parallel to each other and enable light guide by total reflection, the light-incident part has a third reflection surface at a predetermined angle with respect to the first reflection surface, the light-exiting part has a fourth reflection surface at a predetermined angle with respect to the first reflection surface, (f) a half mirror such as a half mirror layer is provided on the fourth reflection surface, and (g) the light transmission member includes (g1) a see-through aiding part at least having a first surface provided nearly in parallel to a transmission surface opposed to the fourth reflection surface and the second reflection surface, and (g2) a light blocking part that is provided nearer a light guide direction side of the light guide member than the see-through aiding part and prevents light from the light transmission member from being guided to the light guide member.

In the virtual image display system, the image light reflected by the third reflection surface of the light-incident part is propagated while being totally reflected by the first and second reflection surfaces of the light guide part, and reflected by the fourth reflection surface of the light-exiting part and enters an eye of an observer as a virtual image. In this regard, the light guide member can be integrally fabricated with high accuracy to have a polygonal outer shape, and the virtual image can be observed with high accuracy via the light guide member. Further, by combining the light guide member and the light transmission member, see-through observation can be realized via the see-through aiding part and superimposition of an external image on the virtual image may be observed. Furthermore, the light blocking part provided at the light guide direction side, i.e., the deeper side in the light guide direction of the light transmission member prevents the light from the light transmission member from being guided to the light guide member, and thus, luminous flux that has passed through the half mirror such as a half mirror layer, for example, and reached inside of the light transmission member is processed not to be ghost light by the light transmission member, and the ghost light may be prevented from being returned to the light guide member.

In a specific aspect of the invention, in the virtual image display system, the light blocking part is a tapered part having a thickness smaller toward the light guide direction side. In this case, the reflection angle of the ghost light that has passed through the half mirror and reached the light transmission member gradually becomes smaller within the tapered part and no longer satisfies a total reflection condition, and the light is ejected to the outside in the position diverging from the eye of the observer. That is, the ghost light may be suppressed from reaching the eye by the tapered part.

In another aspect of the invention, the light transmission member has a second surface provided nearly in parallel to the first reflection surface and a first surface provided nearly in parallel to the second reflection surface, and the tapered part includes a first tapered surface at an obtuse angle with respect to the first surface and a second tapered surface at an obtuse angle with respect to the second surface. In this case, also the part sandwiched between the first surface and the second surface functions as the see-through aiding part and the ghost light maybe ejected to the outside by the tapered part outside of the see-through aiding part.

In still another aspect of the invention, the light blocking part is a part having a roughened surface. In this case, unwanted light that has reached the light transmission member is diffused by the light blocking part and becomes hard to be returned to the light guide member as ghost light.

In yet another aspect of the invention, the light blocking part is a part having a surface to which light-absorbing paint is applied. In this case, the unwanted light that has reached the light transmission member is absorbed by the light blocking part and becomes hard to be returned to the light guide member as ghost light.

In still yet another aspect of the invention, a number of reflections in the light guide part of first image light output from a first partial area in the image display device is different from a number of reflections in the light guide part of second image light output from a second partial area different from the first partial area with respect to a confinement direction in which an optical path is folded by reflection when the light is guided are different from each other. In this case, using image lights at different numbers of reflections, the angular width of the output angle of the image lights output from the light-exiting part may be taken wider. That is, the image lights from different partial areas or display areas in the image display device may be taken in at relatively wider angles of view, and the display size of the virtual image observed through the light-exiting part may be secured larger. As described above, according to the structure of extracting image lights at different numbers of reflection, the light-exiting part maybe made larger to cover the eye without making the light guide part so much thicker, and good see-through observation may be realized.

In further another aspect of the invention, the confinement direction is a direction in parallel to a section containing a first optical axis passing through the projection system and a normal line of the third reflection surface. Regarding the image lights from different positions with respect to the confinement direction, the numbers of reflections in the light guide part may be made different by making the output angles, i.e., the incident angles to the light-incident part different from one another.

In still further another aspect of the invention, the light guide member and the light transmission member are independently integrally molded by injection molding. In this case, the light guide member and the light transmission member may be mass-produced using the injection molding technology.

In still yet further another aspect of the invention, the light guide member and the light transmission member are respectively molded using a heat polymerization resin material. In this case, lightweight and safety may be improved by the resin and stable and accurate molding can be performed by thermosetting.

BRIEF DESCRIPTION OF THE DRAWINGS

The invention will be described with reference to the accompanying drawings, wherein like numbers reference like elements.

FIG. 12 is a diagram for explanation of a modified example of the light guide member shown in FIG. 2A and the like.

DESCRIPTION OF EXEMPLARY EMBODIMENTS

As below, a virtual image display system according to one embodiment of the invention will be explained with reference to the drawings.

A. Appearance of Virtual Image Display System

Figure 1:
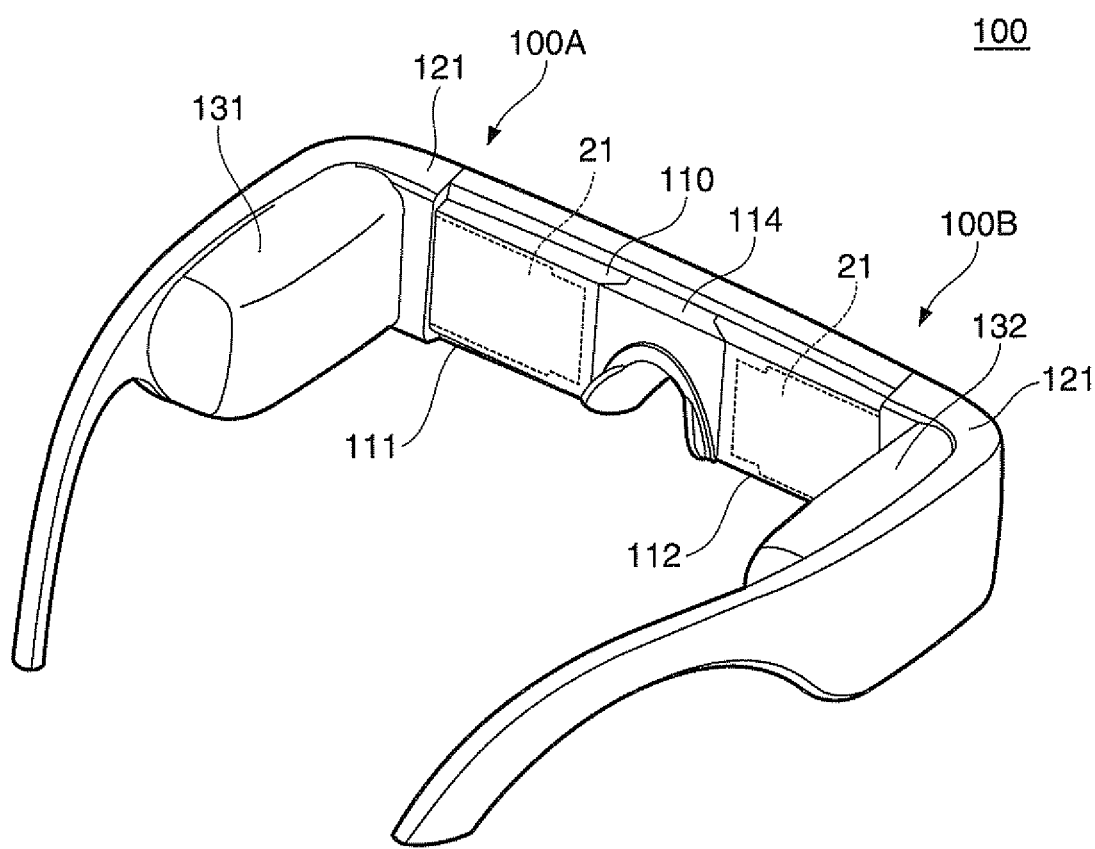
FIG. 1 is a perspective view showing a virtual image display system of an embodiment.

A virtual image display system 100 of the embodiment shown in FIG. 1 is a head-mounted display having an appearance of eyeglasses, and enables an observer wearing the virtual image display system 100 to recognize image light by a virtual image and observe an external image in a see-through manner. The virtual image display system 100 includes an optical panel 110 that covers the view of observer, a frame 121 that supports the optical panel 110, first and second drive parts 131, 132 added to parts from an end piece to a temple of the frame 121. Here, the optical panel 110 has a first panel part 111, a second panel part 112, and a connection part 114, and the panel parts 111, 112 are connected by the connection part 114 at the center to form an integrated plate-like member. A first display 100A formed by combining the first panel part 111 on the left in the drawing and the first drive part 131 is a part that forms a virtual image for left eye and functions as a virtual image display system by itself. Further, a second display 100B formed by combining the second panel part 112 on the right in the drawing and the second drive part 132 is a part that forms a virtual image for right eye and functions as a virtual image display system by itself.

B. Structure of Display

Figure 2A:
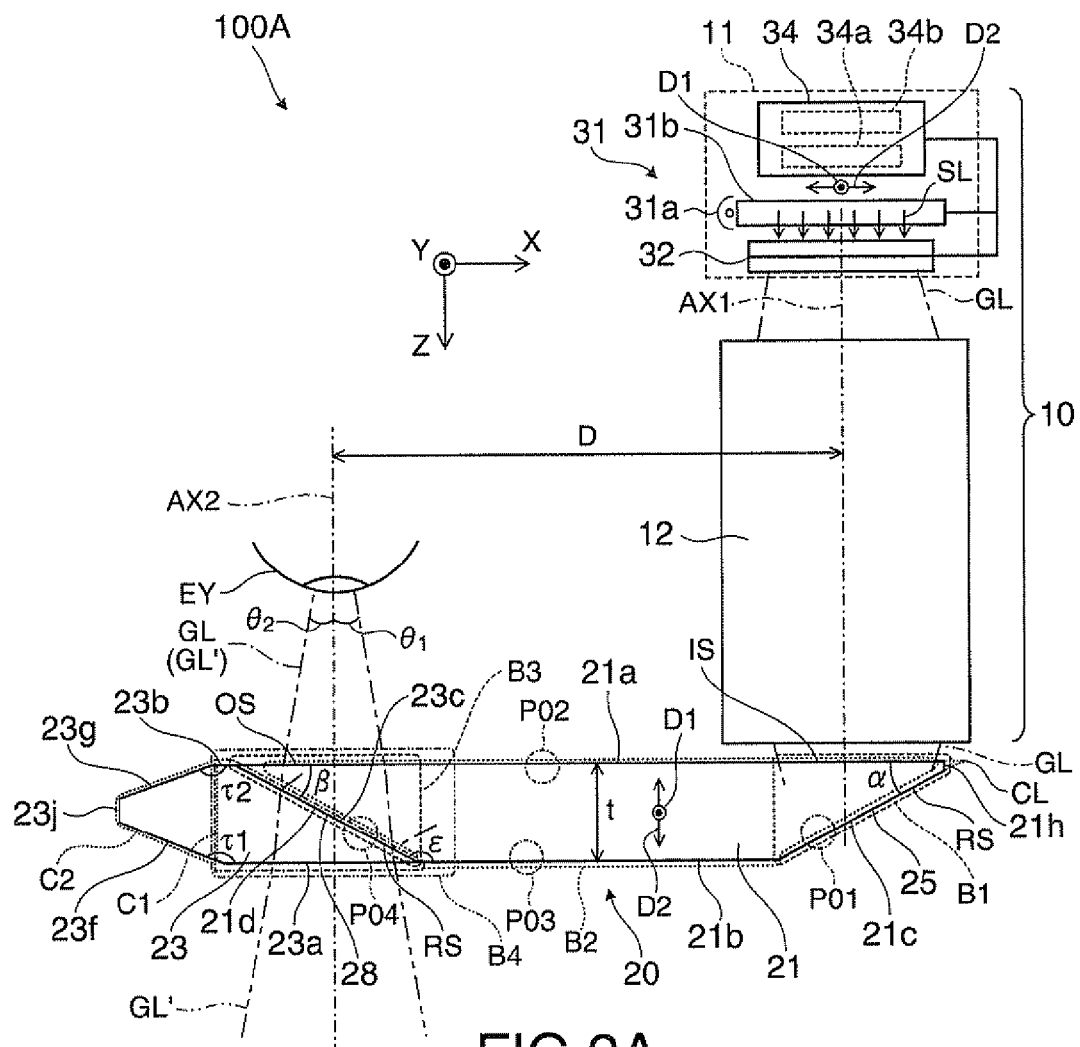
FIG. 2A is a plan view of a main body part of a first display forming the virtual image display system.
Figure 2B:
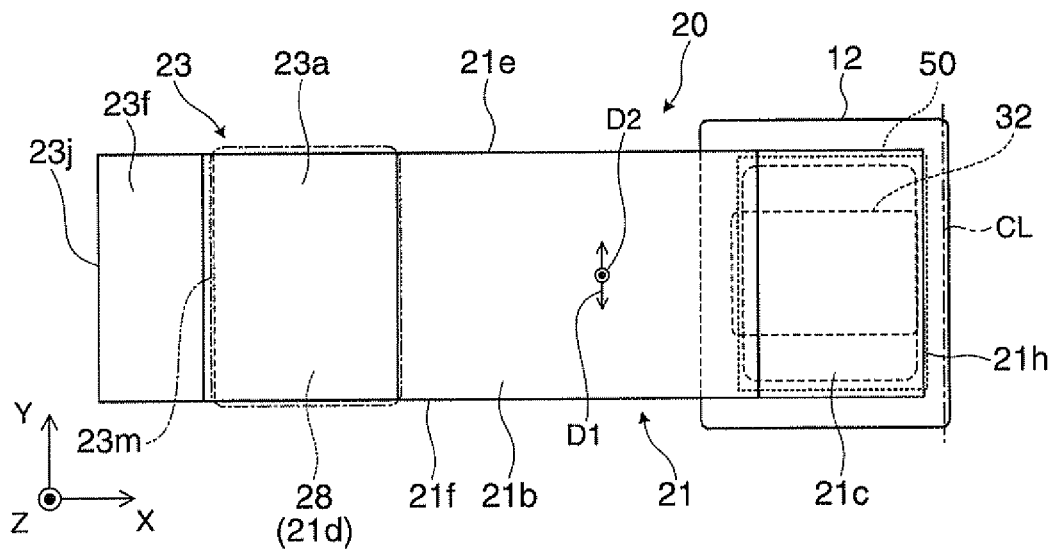
FIG. 2B is a front view of the main body part.

As shown in FIG. 2A and the like, the first display 100A includes an image forming unit 10 and a light guide unit 20. Here, the image forming unit 10 corresponds to the first drive part 131 in FIG. 1 and the light guide unit 20 corresponds to the first panel part 111 in FIG. 1. Note that the second display 100B shown in FIG. 1 has the same structure as that of the first display 100A and just horizontally reversed, and the detailed explanation of the second display 100B will be omitted.

The image forming unit 10 has an image display unit 11 and a projection system 12. Of them, the image display unit 11 has an illumination device 31 that outputs two-dimensional illumination light SL, a liquid crystal display device 32 as a transmissive spatial light modulation device, and a drive control part 34 that controls the operation of the illumination device 31 and the liquid crystal display device 32.

The illumination device 31 has a light source 31a that generates light containing three colors of red, green, blue, and a backlight light guide part 31b that diffuses the light from the light source 31a into luminous flux having a rectangular section. The liquid crystal display device 32 spatially modulates the illumination light SL from the illumination device 31 and forms image light to be displayed as a moving image or the like. The drive control part 34 includes a light source drive circuit 34a and a liquid crystal drive circuit 34b. The light source drive circuit 34a supplies electric power to the light source 31a of the illumination device 31 and outputs the illumination light SL with stable illuminance. The liquid crystal drive circuit 34b outputs an image signal or a drive signal to the liquid crystal display device 32, and thereby, forms color image light as an original of a moving image or a still image as a transmittance pattern. Note that the liquid crystal drive circuit 34b may be provided with an image processing function, or an external control circuit may be provided with the image processing function. The projection system 12 is a collimator lens that brings the image lights output from the respective points on the liquid crystal display device 32 into parallel luminous fluxes.

In the liquid crystal display device 32, a first direction D1 corresponds to a direction in which a longitudinal section containing a first optical axis AX1 passing through the projection system 12 and a specific line in parallel to a third reflection surface 21c of a light guide member 21, which will be described later, extends and a second direction D2 corresponds to a direction in which a cross section containing the first optical axis AX1 and the normal line of the third reflection surface 21c extends. In other words, the first direction D1 is a direction in parallel to a line of intersection CL between a first reflection surface 21a, and the third reflection surface 21c of the light guide member 21, which will be described later, and the second direction D2 is a direction in parallel to the plane of the first reflection surface 21a and orthogonal to the line of intersection CL between the first reflection surface 21a and the third reflection surface 21c. That is, in the position of the liquid crystal display device 32, the first direction D1 corresponds to the longitudinal Y direction and the second direction D2 corresponds to the lateral X direction.

The light guide unit 20 is formed by bonding the light guide member 21 and a light transmission member 23, and forms an optical member having a flat plate shape extending in parallel to the XY plane as a whole.

Of the light guide unit 20, the light guide member 21 is a trapezoidal prism-like member in the plan view, and has the first reflection surface 21a, a second reflection surface 21b, the third reflection surface 21c, and a fourth reflection surface 21d as side surfaces. Further, the light guide member 21 has an upper surface 21e and a lower surface 21f adjacent to the first, second, third, and fourth reflection surfaces 21a, 21b, 21c, 21d and opposed to each other. Here, the first and second reflection surfaces 21a, 21b extend along the XY plane and are separated by a thickness t of the light guide member 21. Further, the third reflection surface 21c is tilted at an acute angle α equal to or less than 45° with respect to the XY plane, and the fourth reflection surface 21d is tilted at an acute angle β equal to or less than 45° with respect to the XY plane, for example. The first optical axis AX1 passing through the third reflection surface 21c and a second optical axis AX2 passing through the fourth reflection surface 21d are provided in parallel and separated at a distance D. Note that, as will be described in details, an end surface 21h is provided between the first reflection surface 21a and the third reflection surface 21c to remove an edge. The light guide member 21 has a polyhedral outer shape with seven surfaces including the end surface 21h.

The light guide member 21 guides light using total reflection by the first and second surfaces 21a, 21b. As directions perpendicular to the light guide direction, there are a direction in which the light is folded by reflection when guided and a direction in which the light is not folded by reflection when guided. In consideration of the image guided by the light guide member 21, the lateral direction in which the light is folded by plural times of reflection when guided, i.e., the confinement direction is perpendicular to the first and second reflection surfaces 21a, 21b (in parallel to the Z-axis) and corresponds to the second direction D2 of the liquid crystal display device 32 when the optical path is developed to the light source side as described below, and the longitudinal direction in which the light is not folded by reflection when guided, i.e., the free propagation direction is in parallel to the first and second reflection surfaces 21a, 21b and the third reflection surface 21c (in parallel to the Y-axis) and corresponds to the first direction D1 of the liquid crystal display device 32 when the optical path is developed to the light source side as described below.

The light guide member 21 is formed from a resin material exhibiting high light-transmissivity in the visible range. The light guide member 21 is a block-like member integrally molded by injection molding, and formed by injecting a heat polymerization resin material into a mold and thermally curing it, for example. As described above, the light guide member 21 is an integrally-molded member, but functionally, may be divided into a light-incident part 31, a light guide part 32, and a light-exiting part B3.

The light-incident part 31 is a triangular prism-like part, and has a light-incident surface IS as a part of the first reflection surface 21a and the third surface 21c opposed to the light-incident surface IS. The light-incident surface IS is a surface at the rear side or the observer's side for taking in the image light GL from the image forming unit 10, and extends to face the projection system 12 perpendicularly to its first optical axis AX1. The third reflection surface 21c is a rectangular total reflection mirror for reflecting the image light GL that has passed through the light-incident surface IS and guiding it into the light guide part B2.

Figure 3A:
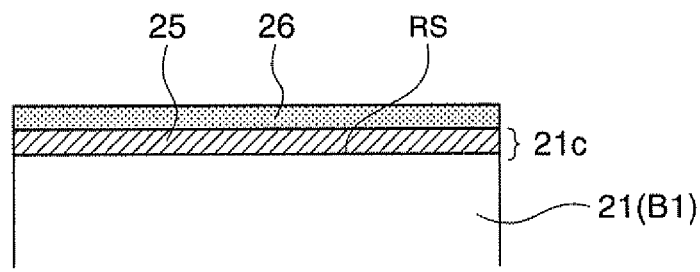
FIG. 3A is a diagram for explanation of a structure of a third reflection surface in a light-incident part of a light guide member.

FIG. 3A is a diagram for explanation of the third reflection surface 21c, and a partially enlarged sectional view of a surface part P01 in the light-incident part B1. The third reflection surface 21c has a mirror layer 25 and is coated with a protective layer 26. The mirror layer 25 is a total reflection coating and formed by deposition using evaporation of aluminum or the like on the slope RS of the light guide member 21.

Returning to FIG. 2A and the like, the third reflection surface 21c is tilted at the acute angle α=25° to 27°, for example, with respect to the first optical axis PM of the projection system 12 or the XY plane, folds the image light GL that has entered from the light-incident surface IS toward the +Z direction as a whole in the –X direction near the –Z direction as a whole, and thereby, reliably couples the image light GL within the light guide part B2.

The light guide part B2 has the first reflection surface 21a and the second reflection surface 21b that respectively totally reflect the image lights that have been folded in the light-incident part B1 as two surfaces opposed to each other and extending in parallel to the XY plane. The distance between the first and second reflection surfaces 21a, 21b, i.e., the thickness t of the light guide member 21 is set to about 9 mm, for example. Here, the first reflection surface 21a is located at the rear side or the observer's side near the image forming unit 10, and the second reflection surface 21b is located at the front side or the external side far from the image forming unit 10. In this case, the first reflection surface 21a is a surface part in common with the light-incident surface IS and a light-exiting surface OS, which will be described later. The first and second reflection surfaces 21a, 21b are total reflection surfaces using refractive index differences, and provided with no reflection coatings such as mirror layers.

Figure 3B:
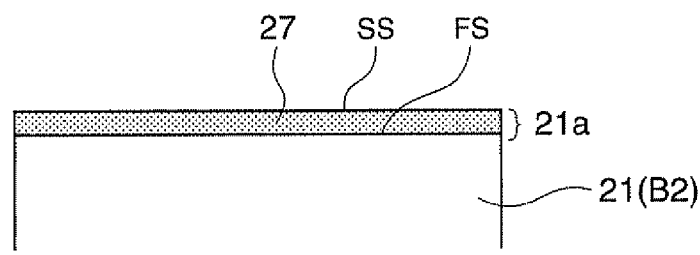
FIG. 3B is a diagram for explanation of a structure of a first reflection surface in the light guide part of the light guide member.
Figure 3C:
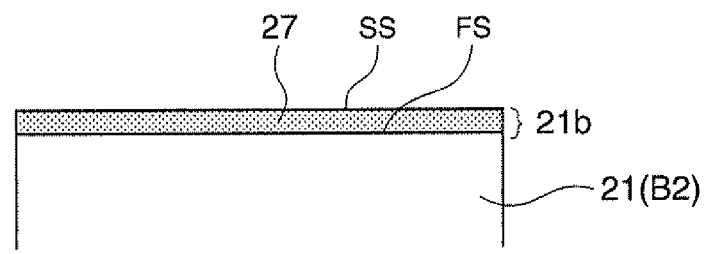
FIG. 3C is a diagram for explanation of a structure of a second reflection surface in the light guide part of the light guide member.

FIG. 3B is a diagram for explanation of the first reflection surface 21a, and a partially enlarged sectional view of a surface part P02 in the light guide part B2 of the light guide member 21. Further, FIG. 3C is a diagram for explanation of the second reflection surface 21b, and a partially enlarged sectional view of a surface part P03 in the light guide part 32 of the light guide member 21. The first and second reflection surfaces 21a, 21b are coated with hard coating layers 27 for prevention of damage on the surfaces and prevention of reduction of resolution of images (see FIG. 3B). The hard coating layer 27 is formed by deposition of an UV-curable resin, a thermosetting resin, or the like on the flat surface FS of the light guide member 21 using dip treatment or spray coating. The image light GL reflected by the third reflection surface 21c of the light-incident part B1 first enters the first reflection surface 21a and is totally reflected. Then, the image light GL enters the second reflection surface 21b and is totally reflected. Subsequently, the operation is repeated, and the image light is guided to the deeper side of the light guide unit 20, i.e., the –X side at which the light-exiting part B3 is provided. Note that, since the first and second reflection surfaces 21a, 21b are provided with no reflection coatings, the external light or outside light entering the second reflection surface 21b from the external side is transmitted through the light guide part B2 at high transmittance. That is, the light guide part B2 is of a see-through type that can see through an external image.

The total reflection in the first and second reflection surfaces 21a, 21b depends on the settings of the refractive indices of the hard coating layers 27 and may typically be caused inside of the surfaces SS of the hard coating layers 27, however, it may be caused inside of the flat surface FS.

Returning to FIG. 2A and the like, the light-exiting part B3 is a triangular prism-like part, and has the light-exiting surface OS as a part of the first reflection surface 21a and the fourth reflection surface 21d opposed to the light-exiting surface OS. The light-exiting surface OS is a surface at the rear side for outputting the image light GL toward an eye EY of the observer, forms a part of the first reflection surface 21a like the light-incident surface IS, and extends perpendicularly to the second optical axis AX2. The distance D between the second optical axis AX2 passing through the light-exiting part B3 and the first optical axis AX1 passing through the light-incident part B1 is set to 50 mm, for example, in consideration of the width of the head of the observer or the like. The fourth reflection surface 21d is a rectangular flat surface that reflects the image light GL that have entered through the first and second reflection surfaces 21a, 21b and output it to the outside of the light-exiting part B3, and has a half mirror layer 28 as a half mirror. The half mirror layer 28 is a reflection film having light-transmissivity (i.e., a semi-transmissive reflection film), and its surface is a semi-transmissive reflection surface.

Figure 3D:
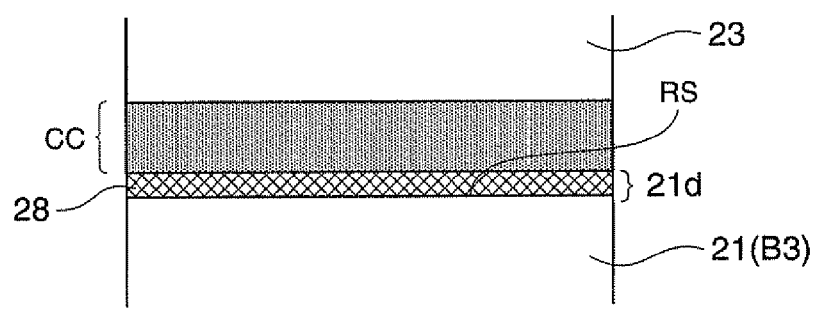
FIG. 3D is a diagram for explanation of a structure of a fourth reflection surface in the light-exiting part of the light guide member.

FIG. 3D is a diagram for explanation of a structure of the fourth reflection surface 21d and a periphery thereof, and a partially enlarged sectional view of a surface part P04 in the light-exiting part B3 of the light guide member 21. FIG. 3D shows the half mirror layer (light-transmissive reflection film or semi-transmissive reflection film) 28 and the like in the enlarged view. The half mirror layer (light-transmissive reflection film or semi-transmissive reflection film) 28 is formed by deposition of a metal reflection film and a dielectric multilayer film on the slope RS of the light guide member 21. The reflectance of the half mirror layer 28 for the image light GL is set from 10% to 50% in the assumed incident angle range of the image light GL in view of facilitation of observation of external light GL' by seeing through. The reflectance of the half mirror layer 28 for the image light GL in a specific embodiment is set to 20%, for example, and the transmittance for the image light GL is set to 80%, for example. Note that the part between the fourth reflection surface 21d of the light-exiting part B3 and a transmission surface 23c of the light transmission member 23, which will be described later, is filled with an adhesive layer CC for bonding the light transmission member 23 to the light-exiting part B3.

Returning to FIG. 2A and the like, the fourth reflection surface 21d is tilted at the acute angle β=25° to 27°, for example, with respect to the second optical axis AX2 perpendicular to the first reflection surface 21a or the XY plane, partially reflects the image light GL, that has entered through the first and second reflection surfaces 21a, 21b of the light guide part B2 by the half mirror layer 28 and folds it toward the –Z direction as a whole, and thereby, allows the light to pass through the light-exiting surface OS. Note that the image light GL that has transmitted through the fourth reflection surface 21d enters the light transmission member 23 and is not used for formation of images.

The light transmission member 23 is a polygonal column member having the same refractive index as that of the main body of the light guide member 21, and has a first surface 23a, a second surface 23b, the transmission surface 23c, a first tapered surface 23f, a second tapered surface 23g, and an end surface 23j as side surfaces. The first and second surfaces 23a, 23b extend along the XY plane. Further, the transmission surface 23c is tilted with respect to the XY plane and provided to be opposed and in parallel to the fourth reflection surface 21d of the light guide member 21. The first tapered surface 23f is adjacent to the first surface 23a with an obtuse angle τ1 formed between the first surface 23a and itself, and the second tapered surface 23g is adjacent to the second surface 23b with an obtuse angle τ2 formed between the second surface 23b and itself. The light transmission member 23 is formed from a resin material exhibiting high light-transmissivity in the visible range like the light guide member 21. The light transmission member 23 is a block-like member integrally molded by injection molding, and formed by injecting a heat polymerization resin material into a mold and thermally curing it, for example. As described above, the light transmission member 23 is an integrally-molded member, but functionally, may be divided into a see-through aiding part C1 and a tapered part C2.

The see-through aiding part C1 is a trapezoidal prism-like part, and has the first surface 23a, the second surface 23b, and the transmission surface 23c. The first surface 23a is provided in parallel on the extension surface of the second reflection surface 21b provided in the light guide member 21 and located at the front side far from the eye EY of the observer, and the second surface 23b is provided in parallel on the extension surface of the first reflection surface 21a provided in the light guide member 21 and located at the rear side near the eye EY of the observer. That is, the first surface 23a and the second surface 23b are opposed to each other and extend in parallel with respect to the XY plane and the distance between the first and second surfaces 23a, 23b, i.e., the thickness of the light transmission member 23 is the same as that of the light guide member 21 and set to about 9 mm, for example. The transmission surface 23c is a rectangular transmission surface bonded to the fourth reflection surface 21d of the light guide member 21 using an adhesive. The angle formed by the first surface 23a and the transmission surface 23c is equal to the angle β formed by the first reflection surface 21a and the fourth reflection surface 21d of the light guide member 21, and the angle formed by the second surface 23b and the transmission surface 23c is equal to the angle c formed by the second reflection surface 21b and the fourth reflection surface 21d of the light guide member 21. Note that the first surface 23a and the second surface 23b may be coated with hard coating layers for prevention of damage on the surfaces and prevention of reduction of resolution of images like the first and second reflection surfaces 21a, 21b of the light guide member 21.

The see-through aiding part C1 forms a see-through part B4 in cooperation with the part at the light guide direction side (or the deeper side), i.e., at the −X side of the light guide member 21. Of the see-through aiding part C1, a wedge-shaped member 23m sandwiched between the first surface 23a and the third surface 23c forming an acute angle with each other and spreading in the −X direction is bonded to the light-exiting part B3 also having a wedge shape, and forms a center part with respect to the X direction in the plate-like see-through part B4 as a whole. That is, the first and second surfaces 23a, 23b are provided with no reflection coatings such as mirror layers, and transmit the external light GL' at high transmittance like the light guide part B2 of the light guide member 21. Also, the transmission surface 23c can transmit the external light GL' at high transmittance, however, because the fourth reflection surface 21d of the light guide member 21 has the half mirror layer 28, the external light GL' passing through the transmission surface 23c or the like is reduced by 20%, for example. That is, the observer observes superimposition of the image light GL reduced to 20% and the external light GL' reduced to 80%.

The tapered part C2 is a triangular prism-like part, and has the first tapered surface 23f, the second tapered surface 23g, and the end surface 23j sandwiched between them. The tapered part C2 is a light blocking part and sandwiched between the first tapered surface 23f and the second tapered surface 23g, and has a thickness reduced toward the deeper side in the light guide direction of the light guide member 21, i.e., the −X side. The taper angle 360°−(τ1+τ2) formed by the first tapered surface 23f and the second tapered surface 23g is set to 60° to 160°, for example. The end surface 23j is not essential, and unnecessary when the light transmission member 23 is integrated with the connection part 114 of the optical panel 110 shown in FIG. 1.

The above described tapered part (light blocking part) C2 has a function of ejecting the light entering the light transmission member 23 from the light guide member 21 via the half mirror layer 28, which is likely to be ghost light, outside of the light guide unit 20 as will be described later.

C. Outline of Optical Paths of Image Lights

Figure 4A:
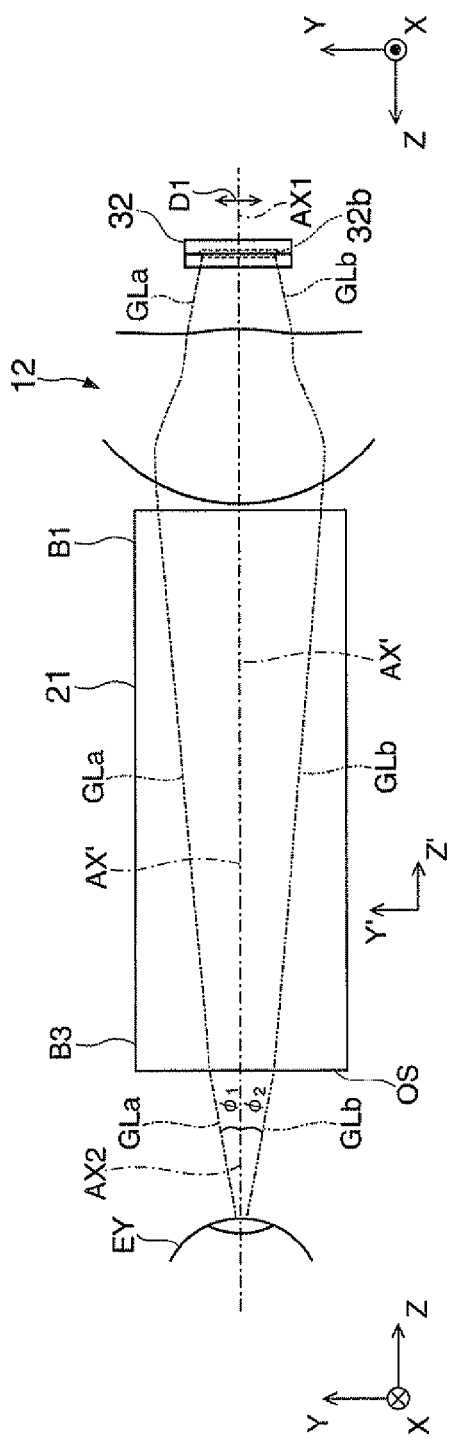
FIG. 4A is a conceptual diagram in which optical paths with respect to a longitudinal first direction are developed.

FIG. 4A is a diagram for explanation of optical paths in the first direction D1 corresponding to the longitudinal section CS1 of the liquid crystal display device 32. In the longitudinal section along the first direction D1, i.e., the YZ plane (the Y'Z' plane after development), of the image lights output from the liquid crystal display device 32, a component output from the upper end side (+Y side) of a display area 32b shown by dashed-dotted lines in the drawing is referred to as image light GLa and a component output from the lower end side (−Y side) of the display area 32b shown by dashed-two dotted lines in the drawing is referred to as image light GLb.

The upper image light GLa is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle φ1 from the upper side. On the other hand, the lower image light GLb is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle φ2 (|φ2|=|φ1|) from the lower side. The above described angles φ1, φ2 correspond to upper and lower half angles of view, and are set to 6.5°, for example.

Figure 4B:
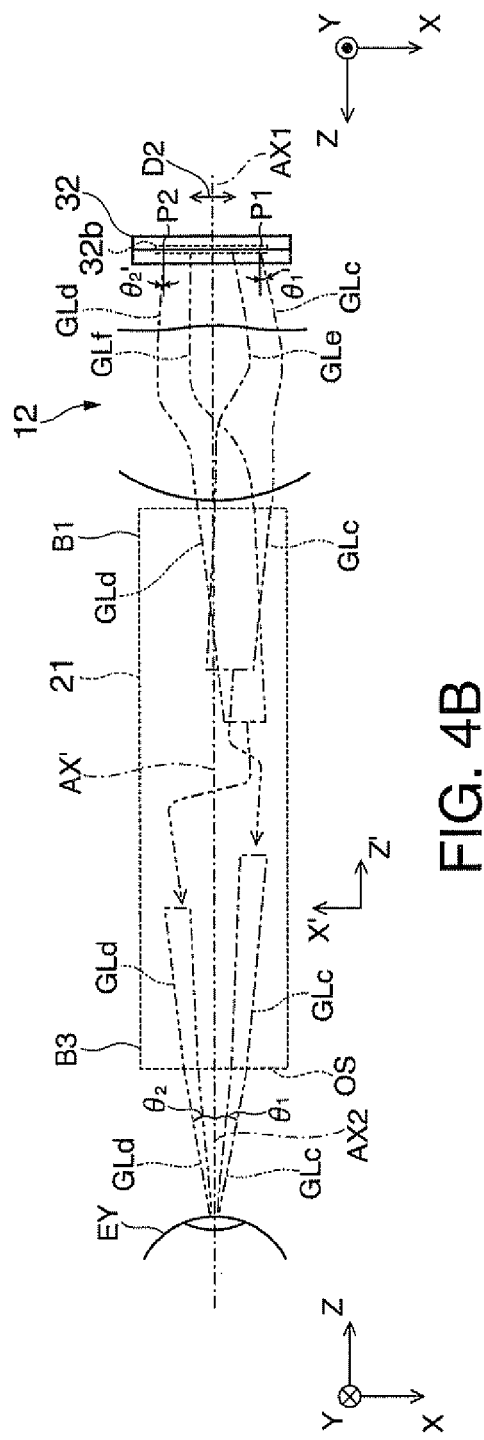
FIG. 4B is a conceptual diagram in which optical paths with respect to a lateral second direction are developed.

FIG. 4B is a diagram for explanation of optical paths in the second direction (confinement direction or combination direction) D2 corresponding to the cross section CS2 of the liquid crystal display device 32. In the cross section along the second direction (confinement direction or combination direction) D2, i.e., the XZ plane (the X'Z' plane after development), of the image lights output from the liquid crystal display device 32, a component output from a first display point P1 at the right end side (+X side) toward the display area 32b shown by dashed-dotted lines in the drawing is referred to as image light GLc and a component output from a second display point P2 at the left end side (−X side) toward the display area 32b shown by dashed-two dotted lines in the drawing is referred to as image light GLd. In FIG. 4B, for reference, image light GLe output from the rightward inner side and image light GLf output from the leftward inner side are added.

The image light GLc from the first display point P1 on the right is brought into parallel luminous flux by the projection system 12, passes through the light-incident part B1, the light guide part 32, and the light-exiting part B3 of the light guide member 21 along the developed optical axis AX', and enters the eye EY of the observer as parallel luminous flux at a tilt of an angle θ1 from the right side. On the other hand, the image light GLd from the second display point P2 on the left is brought into parallel luminous flux by the projection system 12, passes through the light-incident part 31, the light guide part B2, and the light-exiting part B3 of the light guide member 21 along the developed optical axis AX', and enters the eye EY of the observer as parallel luminous flux at a tilt of an angle θ2 (|θ2|=|θ1|) from the left side. The above described angles θ1, θ2 correspond to right and left half angles of view, and are set to 10°, for example.

Note that, regarding the lateral direction of the second direction D2, the image lights GLc, GLd are folded by reflection in the light guide member 21 and the numbers of reflections are different, and the respective image lights GLc, GLd are discontinuously illustrated in the light guide member 21. Further, regarding the eye EY of the observer, the direction of view is vertically inverted compared to the case of FIG. 2A. As a result, regarding the lateral direction, the screen is horizontally reversed as a whole, however, by processing the light guide member 21 with high accuracy in a manner, which will be described later in detail, the right-half image of the liquid crystal display device 32 and the left-half image of the liquid crystal display device 32 are continuously and seamlessly joined. Note that, in consideration of the different numbers of reflections of the image lights GLc, GLd within the light guide member 21 from each other, the output angle $\theta_1'$ of the right image light GLc and the output angle $\theta_2'$ of the left image light GLd are set to different angles.

According to the above described configuration, the image lights GLa, GLb, GLc, GLd entering the eye EY of the observer are virtual images from infinity. With respect to the longitudinal first direction D1, the image formed on the liquid crystal display device 32 is erected and, with respect to the lateral second direction D2, the image formed on the liquid crystal display device 32 is inverted.

D. Optical Paths of Image Lights with Respect to Lateral Direction

Figure 5:
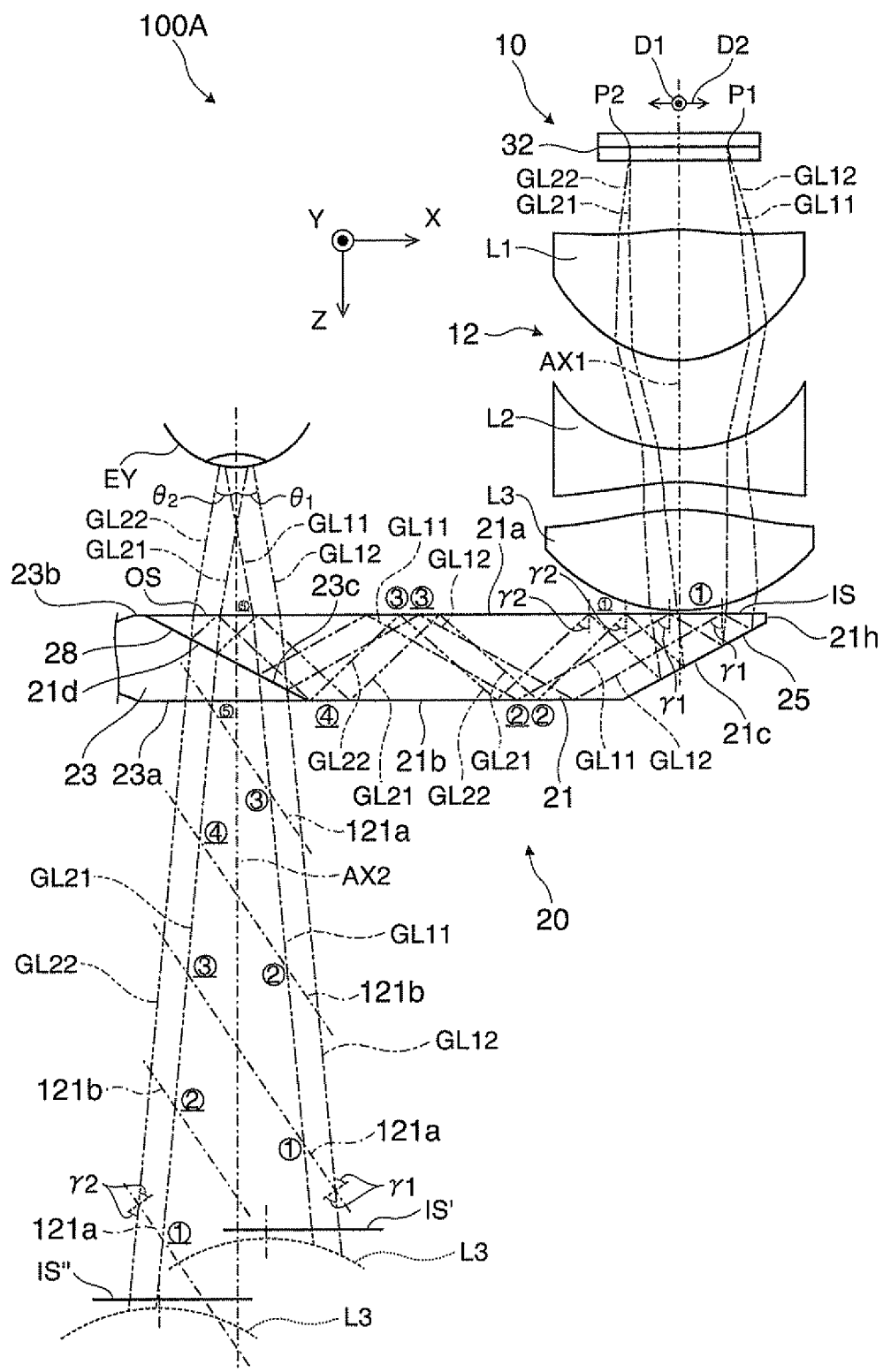
FIG. 5 is a plan view for specific explanation of optical paths in an optical system of the virtual image display system.

FIG. 5 is a sectional view for explanation of specific optical paths in the first display 100A. The projection system 12 has three lenses L1, L2, L3.

The image lights GL11, GL12 from the first display point P1 on the right of the liquid crystal display device 32 pass through the lenses L1, L2, L3 of the projection system 12 into parallel luminous fluxes, and enter the light-incident surface IS of the light guide member 21. The image lights GL11, GL12 that have been guided into the light guide member 21 are repeatedly totally reflected at equal angles on the first and second reflection surfaces 21a, 21b, and finally output as parallel luminous fluxes from the light-exiting surface OS. Specifically, the image lights GL11, GL12 are reflected by the third reflection surface 21c of the light guide member 21 as parallel luminous fluxes, and then, enter the first reflection surface 21a of the light guide member 21 at a first reflection angle γ1, and are totally reflected (the first total reflection). Then, the image lights GL11, GL12 enter the second reflection surface 21b with the first reflection angle γ1 held and are totally reflected (the second total reflection), and then, enter the first reflection surface 21a again and are totally reflected (the third total reflection). As a result, the image lights GL11, GL12 are totally reflected by the first and second reflection surfaces 21a, 21b in a total of three times, and enter the fourth reflection surface 21d. The image lights GL11, GL12 are reflected by the fourth reflection surface 21d at the same angle as that by the third reflection surface 21c, and output from the light-exiting surface OS as parallel luminous fluxes at a tilt of the angle $\theta_1$ with respect to the second optical axis AX2 perpendicular to the light-exiting surface OS.

The image lights GL21, GL22 from the second display point P2 on the left of the liquid crystal display device 32 pass through the lenses L1, L2, L3 of the projection system 12 into parallel luminous fluxes, and enter the light-incident surface TS of the light guide member 21. The image lights GL21, GL22 that have been guided into the light guide member 21 are repeatedly totally reflected at equal angles on the first and second reflection surfaces 21a, 21b, and finally output as parallel luminous fluxes from the light-exiting surface OS. Specifically, the image lights GL21, GL22 are reflected by the third reflection surface 21c of the light guide member 21 as parallel luminous fluxes, and then, enter the first reflection surface 21a of the light guide member 21 at a second reflection angle γ2 (γ2<γ1), and are totally reflected (the first total reflection). Then, the image lights GL21, GL22 enter the second reflection surface 21b with the second reflection angle γ2 held and are totally reflected (the second total reflection), enter the first reflection surface 21a again and are totally reflected (the third total reflection), enter the second reflection surface 21b again and are totally reflected (the fourth total reflection), and enter the first reflection surface 21a again and are totally reflected (the fifth total reflection). As a result, the image lights GL21, GL22 are totally reflected by the first and second reflection surfaces 21a, 21b in a total of five times, and enter the fourth reflection surface 21d. The image lights GL21, GL22 are reflected by the fourth reflection surface 21d at the same angle as that by the third reflection surface 21c, and output from the light-exiting surface OS as parallel luminous fluxes at a tilt of the angle $\theta_2$ with respect to the second optical axis AX2 perpendicular to the light-exiting surface OS.

In FIG. 5, a hypothetical first surface 121a corresponding to the first reflection surface 21a when the light guide member 21 is developed and a hypothetical second surface 121b corresponding to the second reflection surface 21b when the light guide member 21 is developed are illustrated. According to the development, it is known that the image lights GL11, GL12 from the first display point P1 pass through an incident equivalent surface IS' corresponding to the light-incident surface IS, and then, pass through the first surface 121a twice, pass through the second surface 121b once, are output from the light-exiting surface OS, and enter the eye EY of the observer, and the image lights GL21, GL22 from the second display point P2 pass through an incident equivalent surface IS" corresponding to the light-incident surface IS, and then, pass through the first surface 121a at three times, pass through the second surface 121b twice, are output from the light-exiting surface OS, and enter the eye EY of the observer. From a different point of view, the observer observes superimposition of the lenses L3 of the projection system 12 existing near the incident equivalent surfaces IS', IS" in the two different positions.

Figure 6A:
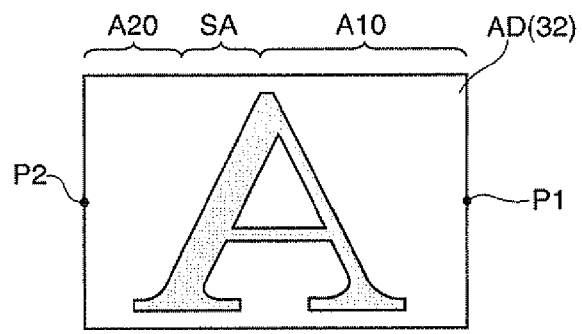
FIG. 6A shows a display surface of a liquid crystal display device.
Figure 6B:
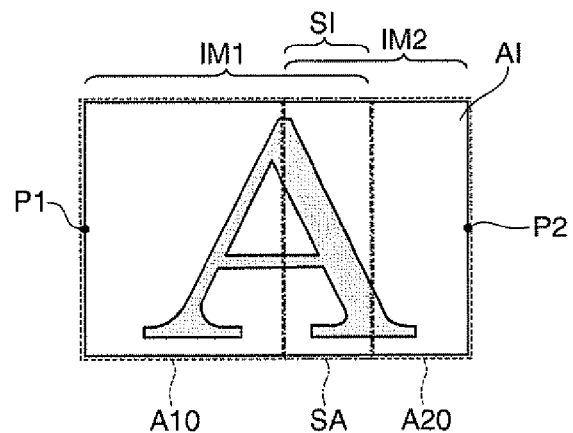
FIG. 6B is a diagram for conceptual explanation of a virtual image of the liquid crystal display device seen from an observer.
Figure 6C:
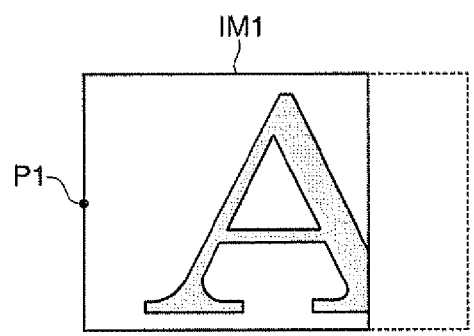
FIGS. 6C and 6D are diagrams for explanation of two partial images forming the virtual image.
Figure 6D:
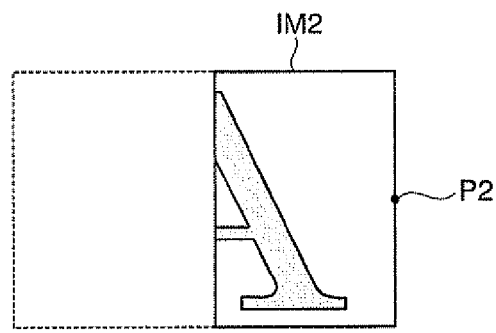

FIG. 6A is a diagram for conceptual explanation of the display surface of the liquid crystal display device 32, FIG. 6B is a diagram for conceptual explanation of a virtual image of the liquid crystal display device 32 seen from the observer, and FIGS. 6C and 6D are diagrams for explanation of partial images forming the virtual image. A rectangular image formation area AD provided in the liquid crystal display device 32 shown in FIG. 6A is observed as a virtual display area AI shown in FIG. 6B. On the left of the virtual display area AI, a first projection image IM1 corresponding to the part from the center to the right side of the image formation area AD of the liquid crystal display device 32 is formed as a virtual image and the first projection image IM1 is a partial image without the right side as shown in FIG. 6C. Further, on the right of the virtual display area AI, a projection image IM2 corresponding to the part from the center to the left side of the image formation area AD of the liquid crystal display device 32 is formed as a virtual image and the second projection image IM2 is a partial image without the left side as shown in FIG. 6D.

Of the liquid crystal display device 32 shown in FIG. 6A, a first partial area A10 that forms only the first projection image (virtual image) IM1 contains the first display point P1 on the right end of the liquid crystal display device 32, for example, and outputs the image lights GL11, GL12 to be totally reflected in a total of three times in the light guide part B2 of the light guide member 21. A second partial area A20, of the liquid crystal display device 32, that forms only the second projection image (virtual image) IM2 contains the second display P2 on the left end of the liquid crystal display device 32, for example, and outputs the image lights GL21, GL22 to be totally reflected in a total of five times in the light guide part B2 of the light guide member 21. The image light from a band SA sandwiched between the first and second partial areas A10, A20 and extending longitudinally near the center of the image formation area AD of the liquid crystal display device 32 forms an overlapping image IS as shown in FIG. 6B. That is, the image light from the band SA of the liquid crystal display device 32 is brought into the first projection image IM1 formed by the image lights GL11, GL12 totally reflected in the total of three times in the light guide part B2 and the second projection image IM2 formed by the image lights GL21, GL22 totally reflected in the total of five times in the light guide part B2 are superimposed on the virtual display area AI when the processing of the light guide member 21 is precise and the accurately collimated luminous fluxes are formed by the projection system 12, misalignment and blurring due to superimposition of the two projection images IM1, IM2 may be prevented in the overlapping image IS.

In the above description, the number of total reflections of the image lights GL11, GL12 output from the first partial area A10 containing the first display point P1 on the right of the liquid crystal display device 32 by the first and second reflection surfaces 21a, 21b has been three in total and the number of total reflections of the image lights GL21, GL22 output from the second partial area A20 containing the second display point P2 on the left of the liquid crystal display device 32 by the first and second reflection surfaces 21a, 21b has been five in total, however, the number of total reflections may be appropriately changed. That is, by adjustment of the outer shape of the light guide member 21 (i.e., the thickness t, the distance D, the acute angles α, β), the number of total reflections of the image lights GL11, GL12 may be five in total and the number of total reflections of the image lights GL21, GL22 may be seven in total. Further, in the above description, the numbers of total reflections of the image lights GL11, GL12, GL21, GL22 have been odd numbers, however, if the light-incident surface IS and the light-exiting surface OS are located at the opposite sides, i.e., the light guide member 21 is formed in a parallelogram shape in the plan view, the numbers of total reflections of the image lights GL11, GL12, GL21, GL22 are even numbers.

Figure 7:
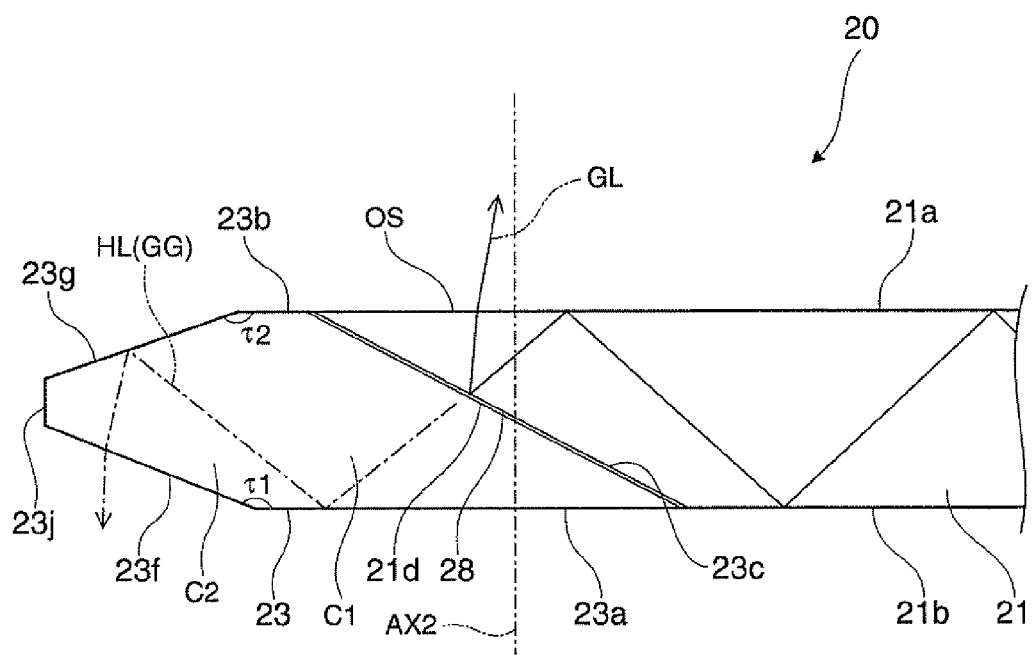
FIG. 7 is an enlarged view for explanation of processing of ghost light in a light guide unit.

FIG. 7 is an enlarged view for explanation of processing of ghost light in the light guide unit 20. In the light-exiting part B3 of the first light guide member 21, the image light GL entering through the first and second reflection surfaces 21a, 21b is reflected by the fourth reflection surface 21d and passes through the light-exiting surface OS. In this regard, the fourth reflection surface 21d is the half mirror, and the image light GL is likely to be observed as ghost light GG when the light passes through the fourth reflection surface 21d with intensity of about 80%, for example. That is, the image light GL that has passed through the fourth reflection surface 21d is reflected by the first surface 23a, and it may be possible that the image light GL passes through the fourth reflection surface 21d to be unwanted light HL, is reflected at multiple times within the light transmission member 23 having the prism-like shape, passes through the fourth reflection surface 21d again, and is output to the observer's side via the light-exiting surface OS. In the embodiment, the unwanted light HL or the ghost light GG is blocked by the tapered part (light blocking part) C2 provided in the light transmission member 23.

In the embodiment, in the light transmission member 23, the tapered part (light blocking part) C2 is provided at the deeper side in the light guide direction than the see-through aiding part C1, i.e., the –X side for reducing the thickness at the deeper side, and the unwanted light HL may be output to the outside of the tapered part C2. Specifically, the tapered part C2 has a shape narrower toward the deeper side, i.e., the –X side, and the reflection angle of the unwanted light HL that has passed through the fourth reflection surface 21d provided with the half mirror layer 28 and the transmission surface 23c gradually becomes smaller at each time when reflected by one of the tapered surfaces 23f, 23g. As a result, the reflection angle of the unwanted light HL gradually becomes smaller within the tapered part C2 and no longer satisfies the total reflection condition, and the light passes through one of the tapered surfaces 23f, 23g in the position out of the see-through part B4 opposed to the eye of the observer and ejected to the outside. As described above, the tapered part C2 has a function of preventing the unwanted light HL from being ghost light GG or reaching the eye Y.

Note that, as long as the tapered part C2 has the shape narrower toward the deeper side, i.e., the –X side, one of the first and second tapered surfaces 23f, 23g may be omitted. That is, if the first tapered surface 23f is omitted, the extended first surface 23a and the second tapered surface 23g may form the tapered shape narrower toward the deeper side, i.e., the –X side, and unwanted light HL may be ejected to the outside of the light transmission member 23 by the tapered shape. Further, if the second tapered surface 23g is omitted, the extended second surface 23b and the first tapered surface 23f may form the tapered shape narrower toward the deeper side, i.e., the –X side, and unwanted light HL may be ejected to the outside of the light transmission member 23 by the tapered shape.

E. Modified Examples

Figure 8:
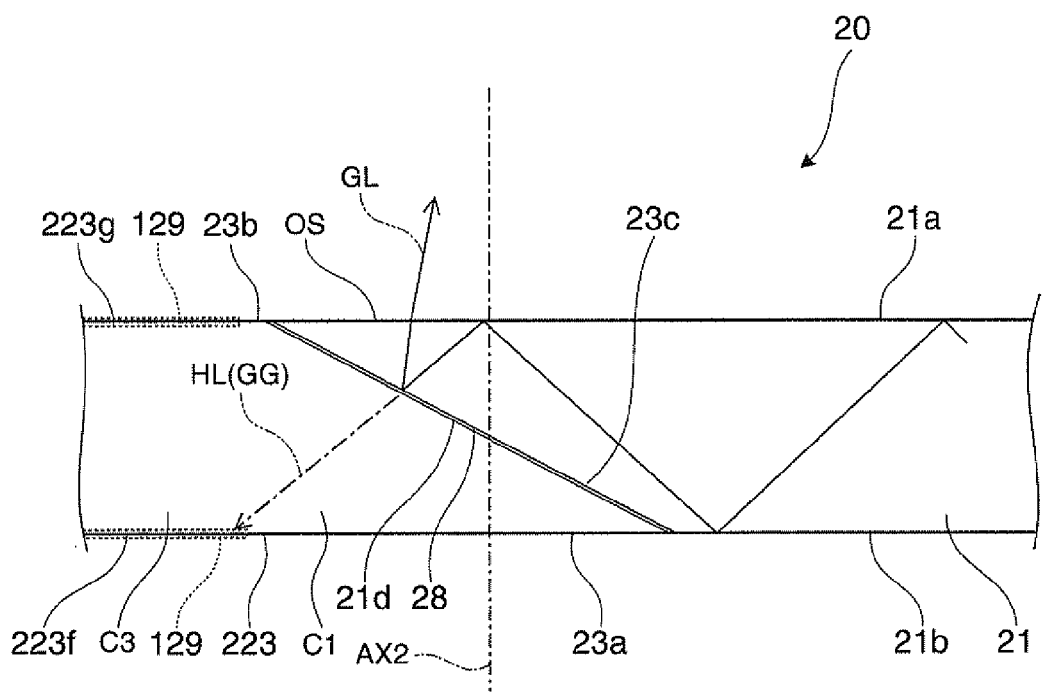
FIG. 8 is an enlarged view for explanation of a virtual image display system of a modified example in which a light transmission member has been changed.

FIG. 8 is a diagram for explanation of a modified example of the light transmission member 23 shown in FIG. 7 and the like. A light transmission member 223 shown in the drawing includes the see-through aiding part C1 and a light diffusion part C3. The light diffusion part C3 is a light blocking part that prevents generation of ghost light GG from image light GL, and has third and fourth surfaces 223f, 223g in parallel to the first and second surfaces 23a, 23b of the see-through aiding part C1, respectively. These third and fourth surfaces 223f, 223g have roughened surfaces 129 formed by roughening of surfaces, and randomly diffuse incident light.

In the modified example, the unwanted light HL as an unwanted component of the image light GL that has passed through the fourth reflection surface 21d provided with the half mirror layer 28 and the transmission surface 23c enters one of the third and fourth surfaces 223f, 223g provided in the light diffusion part (light blocking part) C3 to be diffused, and is not returned to the light guide member 21 side.

Figure 9:
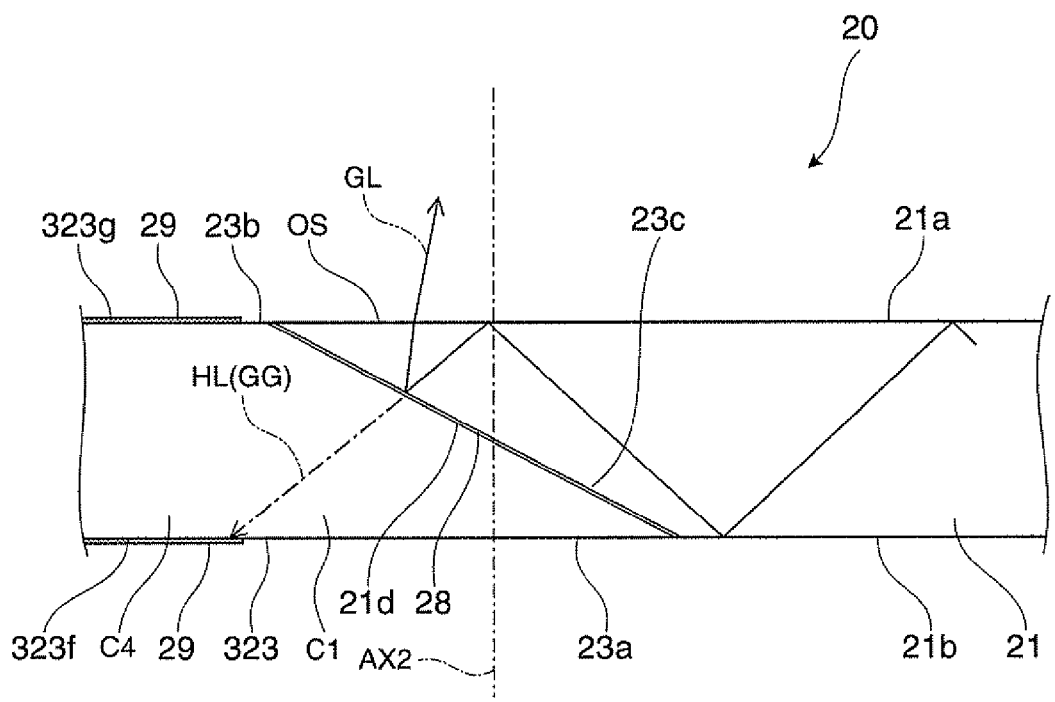
FIG. 9 is an enlarged view for explanation of a virtual image display system of another modified example in which the light transmission member has been changed.

FIG. 9 is a diagram for explanation of another modified example of the light transmission member 23 shown in FIG. 7 and the like. A light transmission member 323 shown in the drawing includes the see-through aiding part C1 and a light absorption part C4. The light absorption part C4 is a light blocking part that prevents generation of ghost light GG from image light GL, and has third and fourth surfaces 323f, 323g in parallel to the first and second surfaces 23a, 23b of the see-through aiding part C1, respectively. These third and fourth surfaces 323f, 323g have light-absorbing layers 29 formed by application of light-absorbing paint.

In the modified example, the unwanted light HL as an unwanted component of the image light GL that has passed through the fourth reflection surface 21d provided with the half mirror layer 28 and the transmission surface 23c enters one of the third and fourth surfaces 323f, 323g provided in the light absorption part (light blocking part) C4 and absorbed by the light-absorbing layer 29, and is not returned to the light guide member 21 side.

Figure 10A:
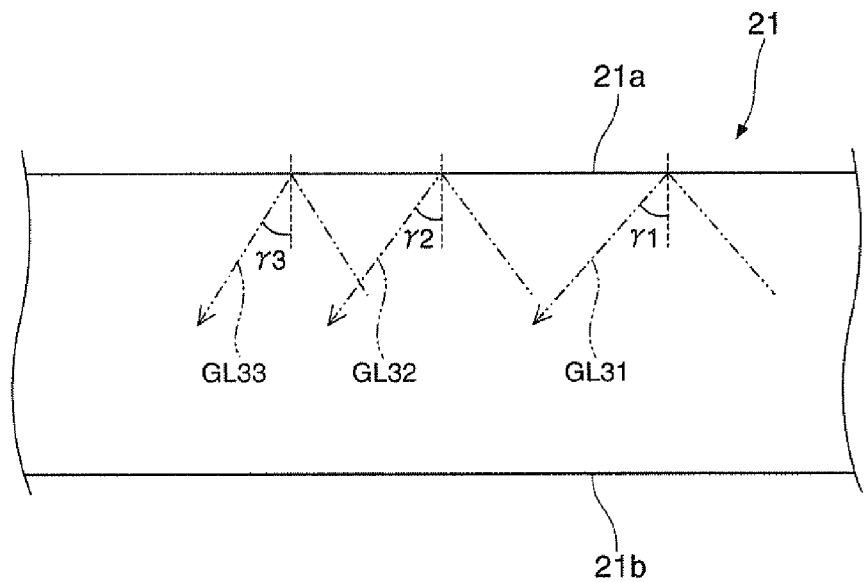
FIG. 10A is a diagram for explanation of a light guide state of image light in a modified example.
Figure 10B:
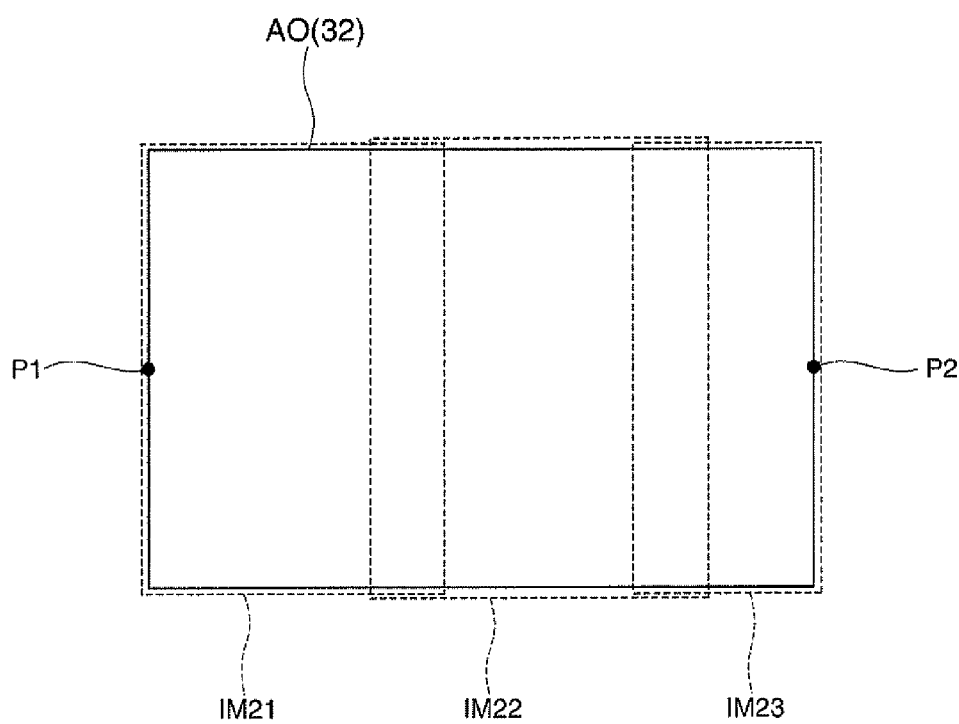
FIG. 10B is a diagram for conceptual explanation of a virtual image of a liquid crystal display device in the modified example.

FIG. 10A is a diagram for explanation of a modified example of the light guide member 21 shown in FIG. 2A and the like. In the above description, the image lights propagating in the light guide member 21 have been totally reflected only at the two reflection angles γ1, γ2 with respect to the first and second reflection surfaces 21a, 21b, however, three components of image lights GL31, GL32, GL33 may be allowed to be totally reflected at reflection angles γ1, γ2, γ3 (γ1>γ2>γ3), respectively, as in the light guide member 21 of the modified example shown in FIG. 10A. In this case, the image light GL output from the liquid crystal display device 32 is propagated in three modes and combined in the position of the eye EY of the observer and observed as a virtual image. In this case, as shown in FIG. 10B, a projection image IM21 by total reflection at three times in total, for example, is formed on the left of an effective display area A0, a projection image IM22 by total reflection at five times in total, for example, is formed near the center of the effective display area A0, and a projection image IM23 by total reflection at seven times in total, for example, is formed on the right of the effective display area A0.

Figure 11:
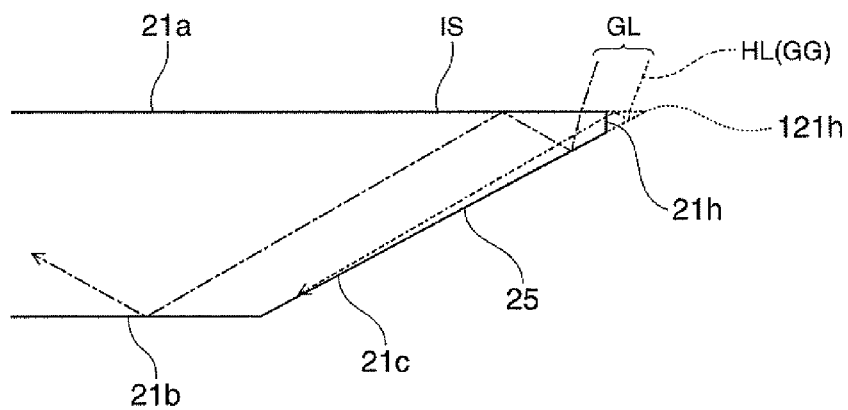
FIG. 11 is a diagram for explanation of a reason why an end surface for removing an edge is provided in the light guide member.

FIG. 11 is an enlarged view for explanation of a reason why the end surface 21h for removing an edge is provided in the light guide member 21 shown in FIG. 2A and the like. The image light GL that has entered the position near an edge 121h of the light guide member 21 is reflected by the third reflection surface 21c, then, reflected by the first reflection surface 21a, and further reflected by the third reflection surface 21c after the reflection by the first reflection surface 21a. The unwanted light HL as re-reflected light is no longer in parallel to the original image light GL and guided into an optical path beyond the scope of the assumption by the reflection on the third reflection surface 21c, and a part of the light may be guided to the light-exiting part B3 and output from the light-exiting surface OS. That is, the unwanted light HL generated in the edge 121h becomes undesired ghost light GG as is the case of FIG. 7, and is desirable to be removed in advance. Accordingly, the edge 121h is removed, the end surface 21h for blocking stray light is provided, and the optical path of the unwanted light HL is restricted.

Figure 12:
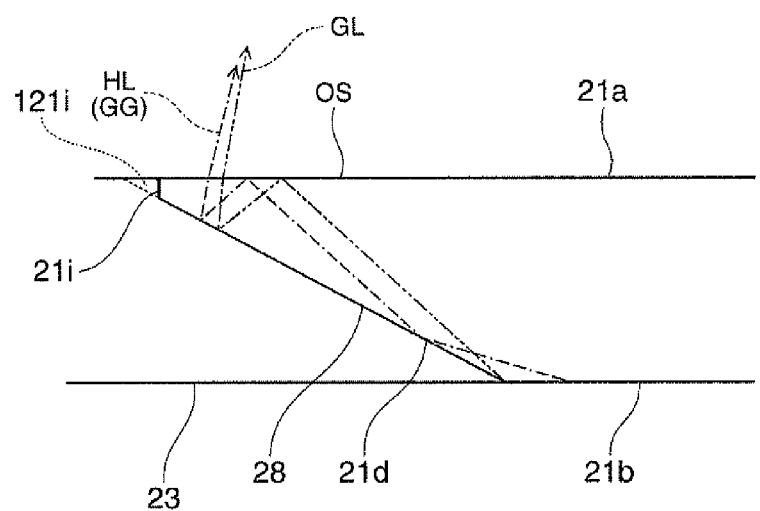

FIG. 12 is an enlarged view for explanation of a modified example of the light guide member 21 shown in FIG. 2A and the like. In this case, an end surface 21i for removing an edge 121i is provided at the fourth reflection surface 21d side of the light guide member 21. That is, the light guide member 21 has a polyhedral outer shape with eight surfaces. On the end surface 21i, for example, a coating or a rough surface with relatively higher reflectance is provided, and a step that fits the end surface 21i is provided on the light transmission member 23. By providing the end surface 21i, the unwanted light HL of the normal image light GL propagating in the light guide member 21 and reflected by the fourth reflection surface 21d twice or more, the unwanted light HL passing through the light guide part B2 after reflection at less than three times and reflected by the fourth reflection surface 21d may be prevented from being output to the outside via the light-exiting surface OS. That is, the normal image light GL is reflected at three times or five times in the light guide part B2 and reflected once by the fourth reflection surface 21d of the light-exiting part B3, and thereby, may be extracted as the image light GL that forms an undisturbed virtual image, however, the luminous fluxes output from the light-exiting part B3 at the other times of reflections become unwanted light HL deviating from the proper output angle. That is, the end surface 21i provided in the light guide member 21 prevents the unwanted light HL passing a path beyond the scope of the assumption at the output angle tilted with respect to the original image light GL from being undesired ghost light GG as is the case of FIG. 7.

F. Others

In the virtual image display system 100 of the embodiment that has been explained, the image light GL reflected by the third reflection surface 21c of the light-incident part B1 is propagated while being totally reflected by the first and second reflection surfaces 21a, 21b of the light guide part, and reflected by the fourth reflection surface 21d of the light-exiting part B3 and enters the eye EY of the observer as a virtual image. In this regard, the numbers of reflections in the light guide part of the first image lights GL11, GL12 output from the first partial area A10 containing the first display point P1 of the image display unit 11 and the numbers of reflections in the light guide part B2 of the second image lights GL21, GL22 output from the second partial area A20 containing the second display point P2 of the image display unit 11 are different, and thus, the angular width of the output angle of the image light GL output from the light-exiting part B3 may be taken wider. That is, the image lights GL from the different partial areas A10, A20 in the image display unit 11 may be taken in at a wider angle of view, and the display size of the virtual image observed through the light-exiting part B3 may be secured larger. As described above, according to the structure of extracting image lights GL at different numbers of reflection, the light-exiting part B3 may be made larger to cover the eye without making the light guide part B2 so much thicker, and it is not necessary to bring the light-exiting part B3 closer to the eye for eye division, and the eye ring diameter may be secured larger, and good see-through observation may be realized.

Further, in the virtual image display system 100 of the embodiment, the thickness of the tapered part C2 provided at the deeper side (the -X side) in the light guide direction of the light transmission member 23 is smaller toward the deeper side, and the reflection angle of the ghost light that has passed through the fourth reflection surface 21d provided with the half mirror layer 28 and reached the light transmission member 23 gradually becomes smaller within the tapered part C2 and no longer satisfies the total reflection condition, and the light is not returned to the light guide member 21, but ejected to the outside in the position diverging from the eye EY of the observer. Alternately, also the light diffusion part C3 and the light absorption part C4 may prevent the ghost light from being returned to the light guide member 21. That is, the tapered part C2, the light diffusion part C3, and the light absorption part C4 may prevent the ghost light from reaching the eye and good see-through observation can be realized.

The invention has been explained according to the embodiments, however, the invention is not limited to the above described embodiments and may be implemented in various forms without departing from the scope of the invention. For example, the following modifications may be made.

In the embodiments, priority has been given to seeing through by setting the reflectance of the half mirror layer 28 provided in the fourth reflection surface 21d of the light guide member 21 to 20%, however, priority may be given to image light by setting the reflectance of the half mirror layer 28 to 50% or higher. Note that the half mirror layer 28 may not necessarily be formed on the entire surface of the fourth reflection surface 21d, and may be formed only in a partial necessary part. Regarding the half mirror layer 28, the half mirror layer 28 maybe formed on the transmission surface 23c of the light transmission member 23, and, in this case, the half mirror layer 28 may substantially function as the fourth reflection surface 21d.

In the embodiments, the first and second surfaces 23a, 23b have been provided in the see-through aiding part C1 of the light transmission member 23, however, the second surface 23b may be omitted. Also, in this case, the second tapered surface 23g may be provided adjacently to the transmission surface 23c.

In the embodiments, in the light transmission member 23, the tapered part C2, the light diffusion part C3, or the light absorption part C4 has been provided entirely in the longitudinal Y direction, however, the tapered part C2, the light diffusion part C3, or the light absorption part C4 may be provided locally in the part in the longitudinal direction, and, also, in this case, generation of ghost light may be suppressed.

In the case where the tapered part C2 is provided in the light transmission member 23, it is desirable to let the ghost light travel to the front side without the eye EY. For the purpose, is it desirable to appropriately adjust the angle τ1 with respect to the first surface 23a of the first tapered surface 23f and the angle τ2 with respect to the second surface 23b of the second tapered surface 23g.

In the case where the tapered part C2 is provided in the light transmission member 23, it is not necessary to make the taper in the uniform one step, and return light may be prevented by parts having a taper in multiple steps or a taper in a curved surface.

In the case where the tapered part C2 is provided in the light transmission member 23, for example, the light diffusion part C3 or the light absorption part C4 may be additionally provided. In this case, the tapered surfaces 23f, 23g are roughened or light-absorbing paint may be applied to the tapered surfaces 23f, 23g.

The shape of the light transmission member 23 is not limited to the shape formed by extending the light guide member 21 laterally, i.e., in the −X direction, but may include a part formed by expanding the light guide member 21 from upper side and the lower side.

In the embodiments, directionality has not been particularly provided to the illumination light SL from the illumination device 31, however, directionality in response to the position of the liquid crystal display device 32 may be provided to the illumination light SL. Thereby, the liquid crystal display device 32 may be efficiently illuminated and brightness irregularities depending on the position of the image light GL may be reduced.

In the embodiments, the display brightness of the liquid crystal display device 32 has not particularly been adjusted, however, display brightness may be adjusted in response to the range and overlapping of the projection images IM1, IM2 as shown in FIG. 6B.

In the embodiments, the transmissive liquid crystal display device 32 or the like has been used as the image display unit 11, however, various devices other than the transmissive liquid crystal display device 32 may be used as the image display unit 11. For example, a configuration using a reflective liquid crystal display device may be employed, or a digital micromirror device, or the like may be employed in place of the liquid crystal display device 32. Further, a self-emitting device represented by an LED array, an OLED (organic EL), or the like may be used as the image display unit 11.

In the virtual image display system 100 of the embodiment, the image forming units 10 and light guide units 20 have been provided in pairs in correspondence to the right eye and the left eye, however, the image forming unit 10 and light guide unit 20 may be provided only for either of the right eye or the left eye for observation by a single eye.

In the embodiments, the first optical axis AX1 passing through the light-incident surface IS and the second optical axis AX2 passing through the light-incident surface IS have been in parallel, however, the optical axes AX1, AX2 may be made not in parallel.

In the above description, the specific explanation has been made with the virtual image display system 100 as the head-mounted display, however, the virtual image display system 100 may be altered to a head-up display.

In the above description, in the first and second reflection surfaces 21a, 21b, the image lights have been totally reflected and guided by interfaces between air and themselves without mirrors, half-mirrors, or the like formed on the surfaces, however, the total reflection in the invention includes reflection by mirror coatings or half-mirror films formed on the entire or parts of the first and second reflection surfaces 21a, 21b. For example, the case where the incident angle of the image light satisfies the total reflection condition and mirror coatings or the like are formed on the entire or parts of the first and second reflection surfaces 21a, 21b and all of the image light is substantially reflected may be included. Further, as long as image light with sufficient brightness is obtained, the entire or parts of the first and second reflection surfaces 21a, 21b may be coated with mirrors with some transmissivity. Note that the entire or parts of the first surface 23a and the second surface 23b of the light transmission member 23 may be coated with mirrors with some transmissivity.

In the above description, the light guide member 21 extends in the lateral direction in which the eyes EY are arranged, however, the light guide member 21 may extend in the longitudinal direction. In this case, the optical panels 110 are arranged in parallel not in series but side by side.

The entire disclosure of Japanese Patent Application No. 2011-030542, filed Feb. 16, 2011 is expressly incorporated by reference herein.

What is claimed is:

1. A virtual image display system comprising:
    an image display device that forms image light;
    a projection system that allows the image light output from the image display device to enter;
    a light guide member having an integrated block shape that has a light guide part, a light-incident part allowing the image light from the projection system to enter the light guide part, and a light-exiting part that outputs the image light guided by the light guide part to the outside, and enables observation of the image light via the light-exiting part; and
    a light transmission member that enables observation of external light by being combined with the light guide member,
    wherein the light guide part has a first reflection surface and a second reflection surface that are provided in parallel to each other and enable light guide by total reflection,
    the light-incident part has a third reflection surface at a predetermined angle with respect to the first reflection surface,
    the light-exiting part has a fourth reflection surface at a predetermined angle with respect to the first reflection surface,
    a half mirror is provided on the fourth reflection surface, and
    the light transmission member includes a see-through aiding part at least having a first surface provided in parallel to a transmission surface opposed to the fourth reflection surface and the second reflection surface, and a light blocking part that is provided nearer a light guide direction side of the light guide member than the see-through aiding part and prevents visible light from the light transmission member from being guided to the light guide member once the visible light passes through the fourth reflection surface.

2. The virtual image display system according to claim 1, wherein the light blocking part is a tapered part having a thickness smaller toward the light guide direction side.

3. The virtual image display system according to claim 2, wherein the light transmission member has a second surface provided nearly in parallel to the first reflection surface and the first surface provided nearly in parallel to the second reflection surface, and the tapered part includes a first tapered surface at an obtuse angle with respect to the first surface and a second tapered surface at an obtuse angle with respect to the second surface.

4. The virtual image display system according to claim 1, wherein the light blocking part is a part having a roughened surface.

5. The virtual image display system according to claim 1, wherein the light blocking part is a part having a surface to which light-absorbing paint is applied.

6. The virtual image display system according to claim 1, wherein a number of reflections in the light guide part of first image light output from a first partial area in the image display device is different from a number of reflections in the light guide part of second image light output from a second partial area different from the first partial area.

7. The virtual image display system according to claim 6, wherein a confinement direction is a direction in parallel to a section containing a first optical axis passing through the projection system and a normal line of the third reflection surface.

8. The virtual image display system according to claim 1, wherein the light guide member and the light transmission member are independently integrally molded by injection molding.

9. The virtual image display system according to claim 8, wherein the light guide member and the light transmission member are respectively molded using a heat polymerization resin material.

* * * * *